United States Patent
Geske et al.

(10) Patent No.: US 10,938,317 B2
(45) Date of Patent: Mar. 2, 2021

(54) LOW LOSS DOUBLE SUBMODULE FOR A MODULAR MULTI-LEVEL CONVERTER AND MODULAR MULTI-LEVEL CONVERTER HAVING SAME

(71) Applicant: GE Energy Power Conversion Technology Limited, Rugby (GB)

(72) Inventors: Martin Geske, Berlin (DE); Joerg Janning, Berlin (DE)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 15/618,862

(22) Filed: Jun. 9, 2017

(65) Prior Publication Data
US 2017/0358999 A1    Dec. 14, 2017

(30) Foreign Application Priority Data
Jun. 9, 2016   (EP) ..................... 16173814

(51) Int. Cl.
*H02M 7/219* (2006.01)
*H02M 1/32* (2007.01)
(Continued)

(52) U.S. Cl.
CPC ............. *H02M 7/219* (2013.01); *H02M 1/32* (2013.01); *H02M 7/483* (2013.01); *H02M 7/5387* (2013.01); *H02M 2007/4835* (2013.01)

(58) Field of Classification Search
CPC ........................... H02M 7/219; H02M 7/5387
See application file for complete search history.

(56) References Cited

U.S. PATENT DOCUMENTS

| 2012/0243282 A1 | 9/2012 | Marquardt | |
| 2015/0365011 A1* | 12/2015 | Ilves ................ | H02M 7/483 363/126 |
| 2016/0365787 A1* | 12/2016 | Geske ............... | H01T 1/14 |

FOREIGN PATENT DOCUMENTS

| DE | 10 103 031 A1 | 7/2002 |
| DE | 10 2010 046 142 A1 | 3/2012 |

(Continued)

OTHER PUBLICATIONS

R. Marquardt, "Modular Multilevel Converter: An universal concept for HVDC-Networks and extended DC-Bus-applications," The 2010 International Power Electronics Conference—ECCE Asia—, Sapporo, 2010, pp. 502-507 (Year: 2010).*

(Continued)

*Primary Examiner* — Kyle J Moody
*Assistant Examiner* — Jye-June Lee
(74) *Attorney, Agent, or Firm* — Wood IP LLC (57) ABSTRACT

A double submodule for a modular multilevel converter comprising a first and second submodule coupled to the first. Each submodule comprises an asymmetric H bridge circuit with two parallel bridges branches, connected between a first and a second direct voltage node of the submodule. Each bridge branch is formed by a series connection from a controllable power semiconductor switch and a diode. A storage capacitor is connected in parallel to the asymmetric H bridge circuit between the first and the second direct voltage node of the submodule. The first and the second submodule are interconnected in such a way that a power semiconductor switch or a diode is part of a bridge branch of the first submodule as well as part of a bridge branch of the second submodule. A modular multilevel converter, comprises a series connection of such double submodules in each of its converter branches, is also disclosed.

20 Claims, 6 Drawing Sheets

(51) Int. Cl.
*H02M 7/483* (2007.01)
*H02M 7/5387* (2007.01)

(56) References Cited

FOREIGN PATENT DOCUMENTS

| EP | 2 368 749 | A2 | | 9/2011 |
|---|---|---|---|---|
| EP | 2 432 109 | A2 | | 3/2012 |
| EP | 2 852 019 | A1 | | 3/2015 |
| EP | 2852019 | A1 | * | 3/2015 |
| WO | 2014/005634 | A1 | | 1/2014 |
| WO | 2014/146721 | A1 | | 9/2014 |

OTHER PUBLICATIONS

M. Fortunato, "Temperature and Voltage Variation of Ceramic Capacitors, or Why Your 4.7μF Capacitor Becomes a 0.33μF Capacitor," Tutorial, Maxim Integrated, Dec. 2012, url: https://pdfserv.maximintegrated.com/en/an/TUT5527.pdf (Year: 2012).*

Ilves, K., et al., "A Submodule Implementation for Parallel Connection of Capacitors in Modular Multilevel Converters," IEEE Transactions on Power Electronics, vol. 30, Issue. 7, pp. 3518-3527 (Jul. 2015).

Ilves, K., et al., "Semi-Full-Bridge Submodule for Modular Multilevel Converters," 9th International Conference on Power Electronics—ECCE, pp. 1067-1074 (Jun. 1-5, 2015).

Li, R., et al., A Hybrid Modular Multilevel Converter with Novel Three-level Cells for DC Fault Blocking Capability, IEEE Transactions on Power Delivery, pp. 1-10 (2015).

Marquardt, R., "Modular Multilevel Converter: An universal concept for HVDC-Networks and extended DC-Bus-applications," The 2010 International Power Electronics Conference, pp. 502-507 (2010).

Modeer, T., et al., "Loss Comparison of Different Sub-Module Implementations for Modular Multilevel Converters in HVDC Applications," Proceddings of Power Electronics and Applications, pp. 1-7 (2011).

Nami, A., et al., "Modular Multilevel Converters for HVDC Applications: Review on Converter Cells and Functionalities," IEEE Transactions on Power Electronics, vol. 30, Issue. 1, pp. 18-36 (Jan. 2015).

Extended European Search Report and Opinion issued in connection with corresponding EP Application No. 16173814.1 dated Dec. 1, 2016.

* cited by examiner

Fig.2

| Switching state | T2 | T3 | T6 | $U_a$ | WC1 | Wc2 | $U'_a$ |
|---|---|---|---|---|---|---|---|
| 1 | 0 | 0 | 0 | $-(U_{c1}\|\|U_{c2})$ | 0,5 | 0,5 | $-U_c$ (parallel) |
| 2 | 1 | 0 | 0 | 0 | 0 | 0 | 0 |
| 3 | 0 | 1 | 0 | 0 | 0 | 0 | 0 |
| 4 | 0 | 0 | 1 | 0 | 0 | 0 | 0 |
| 5 | 1 | 1 | 0 | $+U_{c1}$ | -1 | 0 | $+U_c$ |
| 6 | 0 | 1 | 1 | $+U_{c2}$ | 0 | -1 | $+U_c$ |
| 7 | 1 | 0 | 1 | $+(U_{c1}\|\|U_{c2})$ | -0,5 | -0,5 | $+U_c$ (parallel) |
| 8 | 1 | 1 | 1 | $U_{c1}+U_{c2}$ | -1 | -1 | $+2U_c$ |

| Switching state | T2 | T3 | T5 | T6 | U$_a$ | Wc1 | Wc2 | U'$_a$ |
|---|---|---|---|---|---|---|---|---|
| 1 | 0 | 0 | 0 | 0 | U$_{C1}$-U$_{C2}$ | +1 | +1 | -2U$_c$ |
| 2 | 1 | 0 | 0 | 0 | -U$_{C2}$ | 0 | +1 | -U$_c$ |
| 3 | 0 | 1 | 0 | 0 | -U$_{C2}$ | 0 | +1 | -U$_c$ |
| 4 | 0 | 0 | 1 | 0 | -U$_{C1}$ | +1 | 0 | -U$_c$ |
| 5 | 0 | 0 | 0 | 1 | -U$_{C1}$ | +1 | 0 | -U$_c$ |
| 6 | 1 | 1 | 0 | 0 | U$_{C1}$-U$_{C2}$ | -1 | -1 | ~0 |
| 7 | 0 | 1 | 1 | 0 | -(U$_{C1}$‖U$_{C2}$) | +0.5 | +0.5 | -U$_c$ (parallel) |
| 8 | 0 | 0 | 1 | 1 | -U$_{C1}$+U$_{C2}$ | +1 | -1 | ~0 |
| 9 | 1 | 0 | 1 | 0 | 0 | 0 | 0 | 0 |
| 10 | 1 | 0 | 0 | 1 | 0 | 0 | 0 | 0 |
| 11 | 0 | 1 | 0 | 1 | 0 | 0 | 0 | 0 |
| 12 | 1 | 1 | 1 | 0 | U$_{C1}$‖U$_{C2}$ | 0 | 0 | 0 |
| 13 | 0 | 1 | 1 | 1 | U$_{C1}$‖U$_{C2}$ | 0 | 0 | 0 |
| 14 | 1 | 0 | 1 | 1 | +U$_{C2}$ | 0 | -1 | +U$_c$ |
| 15 | 1 | 1 | 0 | 1 | +U$_{C1}$ | -1 | 0 | +U$_c$ |
| 16 | 1 | 1 | 1 | 1 | +(U$_{C1}$‖U$_{C2}$) | -0.5 | -0.5 | +U$_c$ (parallel) |

LOW LOSS DOUBLE SUBMODULE FOR A MODULAR MULTI-LEVEL CONVERTER AND MODULAR MULTI-LEVEL CONVERTER HAVING SAME

BACKGROUND

Embodiments of the present invention concern a double submodule for a modular multilevel converter and a modular multilevel converter with a series connection of such double submodules.

Converters for converting direct current to alternating current and vice versa are used for many applications, for example for coupling electrical grids with variable-speed drives, as converters for photovoltaic and wind power plants, as frequency converters for pumped storage power stations, for energy exchange between two electrical grids and the like. For this purpose, converters are known in various circuit topologies and configurations. For smaller and medium-sized output, conventional two-level technology converters are known, which offer simple and robust solutions and are widely used.

With continuous development of power semiconductor switches and application possibilities of power electronics, ever newer converter topologies are desired and developed for ever higher power and voltage ranges. In the medium and high-voltage range, so-called modular multilevel converters are frequently used to generate a plurality of voltage levels and to increase the voltages to higher levels up to ranges of high-voltage direct-current (HVDC) transmission, whereby a sufficient voltage quality with a high number of levels can be achieved.

SUMMARY

The modular multilevel converter (MMC and M2C) represents an increasingly popular converter topology. This converter comprises phase branches or modules, which consist of two series-connected converter branches, whereby each converter branch is built from a number of similar cells (submodules). Each submodule is formed by a bridge circuit with controllable power semiconductor switches and an internal capacitor for temporarily storing electrical energy. The bridge circuit can be a half bridge with two controllable power semiconductor switches connected in series, or else a H or full bridge, which has two parallel bridge branches, in each of which two power semiconductor switches are arranged in series with one another. Due to its modular design, the converter is individually scalable for different output and applications. The voltages and currents on the alternating voltage (AC) side and the direct voltage (DC) side can be controlled and regulated highly dynamically and largely decoupled from one another.

Such a modular multilevel converter is known. The submodules are built in the manner of a half bridge. Each submodule has merely two power semiconductor switches connected to each other in series which are interconnected with a capacitor as energy storage of the respective submodule so that a unipolar voltage, either the positive voltage of the capacitor or a zero voltage, drops at the two connection terminals of the submodule. This circuit is relatively inexpensive and characterized by low conduction losses.

Modular multilevel converters with submodules in the form of full or H bridges are also known. The use of full or H bridges allows an inversion of the voltage dropping on the capacitor at the clamps of the submodules. This is however achieved at the expense of a higher number of power semiconductor switches and thus increased switching expense and increased costs for the converter as a whole. Moreover, with such full bridge based submodules in operation there are always two switches energized, whereby the conduction losses compared to half bridge based submodules are significantly increased. For applications in medium and high-voltage range, for example for large drives, or for the coupling of electrical grids, such conduction losses can be unacceptable.

Submodule for a modular multilevel converter with an asymmetric H bridge circuit may comprise two parallel series connections of a power semiconductor switch and a diode, and a capacitor that is connected in parallel to the asymmetric H bridge circuit. The submodule is designed to conduct a unidirectional current and for the generation of a bidirectional voltage and is characterized by reduced switching expense and reduced conduction losses. For example, the number of power semiconductor switches compared to full bridge submodules is reduced to half. In many switching states only one or even no power semiconductor switch is conductive.

An important aspect is also the robustness of the converter in the case of a short circuit in the DC voltage intermediate circuit. If a short circuit occurs in the DC voltage intermediate circuit, which is powered by an AC voltage grid, very high short circuit currents can flow through the converter branches. When using half bridges as submodules, these short circuit currents flow through the freewheeling diodes which are connected antiparallel to the respective power semiconductor switches and can cause damage or even destruction of such and the submodules.

Submodules may comprise two subunits, each of which is formed in the form of a half bridge with a series connection of an IGBT switch and a diode, to which a storage capacitor is connected in parallel, and which comprises connection means that interconnect the two subunits. The connection means comprise an emitter connection branch, which interconnects two IGBT emitters of the two subunits and in which a potential separation diode is arranged in series with a damping resistance, a collector connection branch that interconnects two IGBT collectors of the two subunits, and in which another potential separation diode is arranged in series with a further damping resistance, and a switch branch, which connects the cathode of the potential separation diode of the emitter connection branch to the anode of the potential separation diode of the collector connection branch and in which a switch unit is arranged.

The submodule allows the setting of five different voltage values between its connection terminals. In addition, it has a switching state, which can lead to a reduction of a short circuit current in the event of a fault. If all IGBTs are switched off, a current flow occurs between the connection terminals via both storage capacitors, which are then connected to each other in series or in parallel. In that case a counter voltage builds via the capacitors, which counteracts the short circuit current. The submodule has an advanced functionality compared to a pure parallel circuit of half bridge submodules. However, to do this, a total of five IGBTs, of which usually three are conductively connected, and seven diodes are required. The circuit and component expense and also the conduction losses in the operation are about 50% higher compared to the half bridge, because the proportion of semiconductor devices in the current path in relation to a submodule increases.

Given the different potential uses and requirements, newer configurations of submodules for modular multilevel converters for specific applications are undergoing continual further development with the aim of reducing the number of submodules, the number of power semiconductor switches and the conduction losses and increasing the robustness of the current converter in the case of short circuit.

Double submodule may comprise two full bridge submodules that are interconnected in parallel. These are interconnected via their respective AC voltage connections, while a DC voltage connection of each submodule builds a module connection of the double module. The double submodule can be used for the direct AC-AC conversion. However, it has double as many power semiconductor switches as two half bridge based submodules connected in series.

Double submodule may be formed by two interlaced full bridge submodules, whereby a power semiconductor switch with an antiparallel freewheeling diode belongs to both submodules. Hence, one pair of a power semiconductor switch and a freewheeling diode in relation to two submodules is saved. The circuit and component expense for most applications with DC connection is too high. The conduction losses in operation for DC applications are also about 50% higher than that of the half bridge.

There continues to be a need for new submodule configurations for modular multilevel converters for different applications, which offer the benefits of the half bridge based submodules, including a small number of power semiconductor switches and low conduction losses, while allowing a certain short circuit resistance. If an error occurs in the converter, which causes a sharp increase of the current on the mains, DC current side or in the converter branch, this is detected by the regulating and control unit of the converter and the pulses for the controllable semiconductor power devices are blocked. In order that in the event of a fault the submodule can build in case of a converter pulse block a counter voltage regardless of the current direction, submodule or double submodule configurations with this property may be advantageous. In the event of a fault after the pulse block occurred, the generated counter voltage counteracts the fault current, whereby it can be reduced or even effectively switched off.

Thus, in an embodiment comprises a submodule for use in a modular multilevel converter that may provide similar advantages to half bridge based submodules and is suitable for many applications such as drives, photovoltaic and wind power plants and pumped storage power stations or for the medium or high-voltage direct-current transmission. In particular, the submodule should be built relatively inexpensively, require a relatively low number of power semiconductor switches and cause low conduction losses in operation. The submodule should be able to build a counter voltage to counteract the fault current in the event of a fault. This property should be achieved in the design of the modules so that a relatively small number of power semiconductor devices in the current paths are present during normal operation, to minimize the conduction losses of the semiconductor devices.

An embodiment comprises a modular multilevel converter with a number of such submodules, which thanks to a simple structure can be implemented and operated at relatively low cost.

This task is solved with a double submodule having the characteristics of the independent claim 1 and with a modular multilevel converter having the characteristics of the independent claim 10. Embodiments of the invention are the subject matter of the subordinate claims.

According to an aspect of embodiments of the invention, a double submodule for a modular multilevel converter is created that comprises a first and a second submodule coupled with the first. Every submodule comprises an asymmetric H bridge circuit with two parallel bridge branches that are connected between a first and a second direct voltage node of the submodule, where each bridge branch is built by means of a series connection of a controllable power semiconductor switch and a diode, and a capacitor that is connected in parallel to the asymmetric H bridge circuit between the first and the second DC voltage node of the submodule. The first and the second submodule are interconnected in such a way that a power semiconductor switch or a diode is part of a bridge branch of the first submodule as well as part of a bridge branch of the second submodule.

Thus, according to embodiments of the invention, two asymmetric H bridge circuits are interconnected and built in such a way that a semiconductor device, a power semiconductor switch or a diode can be shared by both submodules. Compared to many well-known double submodules as well as compared to two half bridge submodules connected in series, which the double submodule can functionally replace in many applications, the double submodule comprises a reduced number of power semiconductor switches and in many switching states a relatively smaller number of energized power semiconductor switches. It can create a bipolar output voltage with a total of minimum four levels and can generally conduct a bipolar, in an embodiment a unipolar current. In operation, it can be ensured in many switching states that minimally only three semiconductor power devices are contained in the conduction path so that conduction losses are minimal. Switching states are also possible, where the two capacitors are connected in parallel, which can be used to reduce the energy content or the capacitance of the capacitors or to build a counter voltage in the event of a fault. The double submodule has a simple and low-cost structure that allows a simple control and creates a base for low operating costs.

In embodiments the first submodule of the double submodule can comprise a first bridge branch with a series connection of a first controllable power semiconductor switch and a first diode, whose cathode is directly connected to the first direct voltage node of the first submodule, and a second bridge branch with a series connection of a second controllable power semiconductor switch and a second diode, whose anode is connected directly with the second direct voltage node of the first submodule. The second submodule of the double submodule can comprise a first bridge branch with a series connection of a first controllable power semiconductor switch and a first diode, whose cathode is directly connected to the first direct voltage node of the second submodule, and a second bridge branch with a series connection of a second controllable power semiconductor switch and a second diode, whose anode is connected directly with the second direct voltage node of the second submodule. The connection point between the first power semiconductor switch and the first diode of the first bridge branch of the first submodule then may form a first module connection or a first input/output terminal of the double submodule, while the connection point between the second power semiconductor switch and the second diode of the second bridge branch of the second submodule forms a second module connection or a second input/output terminal of the double submodule. With these module connections, several double submodules can be interconnected in series, to form a modular multilevel converter.

In an embodiment of the double submodule according to embodiments of the invention, the second power semiconductor switch of the second bridge branch of the first submodule forms at the same time the first power semiconductor switch of the first bridge branch of the second submodule. It is thus shared by both submodules. Both submodules are combined and connected to one another through this power semiconductor switch.

In an embodiment the second diode of the second bridge branch of the first submodule forms at the same time the first diode of the first bridge branch of the second submodule. It is thus shared by both submodules. Both submodules are combined and connected to one another through this diode.

An antiparallel connected freewheeling diode can be assigned to each of the power semiconductor switches. The freewheeling diodes are particularly intended to protect the power semiconductor switches, which may be formed by IGBTs, but may also be IGCTs, MOSFETs, GTOs or the like, against unwanted and excessive overvoltages and blocking voltage. The freewheeling diodes could be integrated into the semiconductor structure of the controllable semiconductor switches. For the function of the double submodule, they are however not imperatively required and could also be omitted.

The capacitors can be formed by a unipolar storage capacitor. Also, capacitor batteries of several such storage capacitors could be used, although this is not required for most applications.

Besides the mentioned power semiconductor switches, diodes and capacitors and, if available, the antiparallel freewheeling diodes, no other active or passive electrical or electronic components are contained in the circuit arrangement of the double submodule. In particular, the double submodule is free of resistance components, especially damping resistances in its branches. Due to the topology of the double submodule in combination with a suitable control of the submodules for the setting of certain voltages of the intermediate circuits and/or a suitable choice of the tolerance of the intermediate circuit capacitances and/or a relevant variation of the control voltage of the power semiconductor switches, the submodule can do without additional damping elements, which are normally used for the damping of compensating currents.

As already mentioned, the double submodule is designed to conduct a unipolar power between the first and the second module connection when controlling the power semiconductor switches and to create a bipolar supply voltage between the module connections. In principle, a current could also be conducted in the opposite direction from the second to the first module connection, although this is not provided for the intended applications for converters to supply variable-speed drives for photovoltaic and wind power plants, pumped storage power stations or for direct current transmission. In these applications, low conduction losses are of prime importance, which together with the additional advantage of building a possible counter voltage in the events of a fault makes the double submodule particularly suitable for this purpose.

The double submodule can have multiple, partly redundant switching states, which can be achieved by control of the power semiconductor switches. In any case, when controlling the power semiconductor switches, the double submodule is designed to generate between the second and the first module connection a zero connection voltage, a supply voltage which is equivalent to the voltage of one of the capacitors, a voltage which is equivalent to the sum of the voltages of the capacitors, or a positive or negative supply voltage, which occurs at a parallel circuit of capacitors. The many different voltage levels also allow sophisticated control strategies for the double submodule and in particular for the modular multilevel converter formed from such.

In certain switching states, the double submodule is adapted to conduct a current between the first and the second module connection of the double submodule through two parallel current paths within the double submodule, each containing one of the capacitors of the submodules. The capacitors of the submodules can thus be connected in parallel. This switching state can also make it possible to build up a counter voltage in the event of a fault in order to reduce a short circuit current. As a result, the short circuit resistance of the double submodule and the modular multilevel converter built from such can be improved.

In implementations capacitors are selected for the first and second submodules, which are manufactured with a very small tolerance in their capacitance. The tolerance should be less than 3%. In an embodiment it is less than 1%. In embodiments, it can, if necessary, be even smaller by means of sorting and suitable pairing of capacitors for a double submodule. The double submodule can then be controlled or regulated in operation such that the voltages on the capacitors differ only minimally, for example even by less than 1% or less, so that substantially no or only insignificant compensation currents flow between the capacitors, when these are connected in parallel. In this case, additional losses as well as compensation currents via the semiconductor power devices are kept low and possible damages in continuous operation are avoided.

According to embodiments of the invention, a modular multilevel converter is provided for converting an alternating voltage into a direct voltage or vice versa. The modular multilevel converter comprises at least one phase branch, which comprises an AC voltage connection and at least one DC voltage connection connected to a DC voltage intermediate circuit. A converter branch is formed between each DC voltage connection and each AC voltage connection, wherein at least one double submodule according to embodiments of the invention of each of the above-described embodiments is arranged in each of the converter branches. The advantages of the double submodule, in particular the simple and low-cost design, the low number of power semiconductor switches in the circuit, the small number of energized power semiconductor switches connected in series in the conduction path during operation and the associated comparatively low conduction losses, the possibility of reducing a short circuit current by a counter voltage of two capacitors connected in parallel, also benefit the modular multilevel converter.

The modular multilevel converter can comprise any number of phase branches which correspond to the desired number of phases. In general, three phase branches are provided. Depending on the application, a single phase branch may be sufficient, or two or more than three phases may be required. The modular multilevel converter may comprises a first DC voltage connection, which can be connected to a first, e.g. positive pole of the DC voltage intermediate circuit, and a second DC voltage connection, which can be connected to a second, e.g. negative or more negative pole of the DC voltage intermediate circuit. The same number of double submodules is arranged in each converter branch of the converter. Two or more double submodules connected in series are provided in each case. In principle, however, the converter branches can differ in terms of the number of double submodules.

A control device for controlling the operation of the modular multilevel converter can be provided which is adapted to control the power semiconductor switches according to a predetermined pattern such that a single-phase or multi-phase alternating voltage at an AC voltage connection of the converter is converted to a DC voltage at the DC voltage intermediate circuit or vice versa. In particular, the control device can control the power semiconductor switches such that a bipolar supply voltage can be output and a unipolar current is always transmitted between the module connections of the double submodule. The modular multilevel converter is, like the double submodule per se, suitable for many different applications, e.g. high-voltage direct current (HVDC) transmission, for large power drives, such as for pumped storage power stations, for medium voltage drives, for converter systems for rail power supply, medium-voltage direct current (MVDC) transmission, e.g. for photovoltaic and wind power plants and the like. The present double submodules can replace the half bridge based submodules commonly used in modular multilevel converters with similarly low or only slightly increased conduction losses, but with an improved short circuit resistance and increased flexibility, which is given, for example, through the possibility of the parallel circuit of the capacitors. Compared to the asymmetric H bridge, all the advantages compared to half bridge based submodules remain, while the semiconductor losses can be additionally reduced by approximately 25% by the present double submodule.

In an embodiment, the control device can be configured to detect a short circuit in the DC voltage intermediate circuit and to then turn off or turn on all the power semiconductor switches of all the double submodules in the short circuit path in order to conduct a short circuit current via parallel current paths in each double submodule, whereby each current path comprises one of the capacitors of the submodules. As a result, a counter voltage, which counteracts the short circuit current, can be built up on the capacitors, which then can lead to a rapid reduction of the short circuit current. The converter can be protected against damage and destruction.

The control device can, in particular in connection with a low-tolerance design of the capacitors of the double submodule, be configured to control the voltage across the capacitors of the submodules such that, when switching to a switching state with capacitors connected in parallel, a difference of the voltages of the capacitors does not exceed a predetermined first threshold value. The first threshold value should be set such that high compensating currents and associated problems can be safely avoided. In general, the first threshold value for the difference of the capacitor voltages can be related to the maximum tolerance for the capacitance of the capacitors. It can be proportional to the maximum tolerance for the capacitance of the capacitors or essentially correspond to it.

In addition or alternatively, the control device can be configured to control the voltage across the capacitors of the submodules in such a way that a difference of the capacitor voltages does not fall below a predefined second threshold value before switching to a switching state with parallel capacitors. The second threshold value can again be related to the maximum tolerance for the capacitance of the capacitors. As a result, compensating currents can also be avoided or reduced prior to the parallel circuit of the capacitors in the case of given asymmetries of the capacitances of the capacitors. The control device can use different switching intermediate states in order to slightly charge or discharge at least one of the capacitors in order to conduct the difference of the capacitor voltages into the suitable threshold range of e.g. 5-20 volts, more particularly 5-10 volts.

The control device can also be configured alternatively or additionally to control the voltage across the capacitors of the submodules in such a way that when switching to a switching state with a parallel circuit of the capacitors, the voltage across the capacitor, with its positive and negative direct voltage node each connected to the capacitor via a diode in the forward direction to the other capacitor, is approximately equal to or in certain limits less than the voltage across the capacitor with its positive and negative direct voltage node connected to the capacitor in the blocking direction via a diode. A smooth transition into the parallel circuit of the capacitors can thereby be achieved without high compensating currents flowing. The multiplicity of possible switching states permits a selective setting of the respective capacitor voltages in order to be able to fulfill this condition.

Furthermore, a design of the capacitors with slightly different capacitance values for the achievement of different voltages in certain switching states, which lie temporally before a switching state of the parallel circuit of the two capacitors, can be advantageous in order to satisfy the aforementioned condition of the voltage difference. Accordingly, the first capacitor in the current flow direction can have a slightly smaller capacitance, which may be smaller by 1% to 2% than that of the second capacitor. This makes it possible to ensure that in switching states with a series connection of both capacitor voltages at the output, the voltage ratios resulting from the predetermined current flow direction lead to a low voltage difference, which satisfies the aforementioned condition.

In some embodiments, the control device can also be configured to switch on and operate with a step-wise increased control voltage one or more of the power semiconductor switches, in particular those which are involved in the parallel circuit of the capacitors, when switching over into the switched state of the capacitors. In particular, these power semiconductor switches can initially be controlled with a first control voltage, which is smaller than the usual control voltage, e.g. less than the usual 15 volt gate voltage for IGBTs in order to turn them on in such a way that the power semiconductor switches in the switch-on procedure operate in their active range with desaturating behavior and with a comparatively high transmission resistance, in order to effectively dampen and reduce any occurring compensating currents. Subsequently, for example after a fixed period of time, the power semiconductor switches can be controlled with a higher second control voltage in order to operate them in a low-loss manner in the switched state with the parallel circuit of the capacitors.

BRIEF DESCRIPTION OF THE DRAWINGS

Embodiments of the invention are described in more detail below with reference to a drawing, which shows exemplary, non-limiting embodiments of the invention, wherein the same reference numerals are used in all figures to indicate the same elements. The drawings in detail.

DETAILED DESCRIPTION

Reference will now be made to embodiments of the invention, which are illustrated in the drawings. It should be understood that the embodiments illustrated in the drawings are merely exemplary and do not limit the invention as such. Rather, the embodiments are merely intended to explain possible embodiments and enable the person skilled in the art to carry out the invention. It should further be understood that in an effort to provide a concise description of possible embodiments, not all of the details covered by the scope of the invention may be given.

Figure 1:
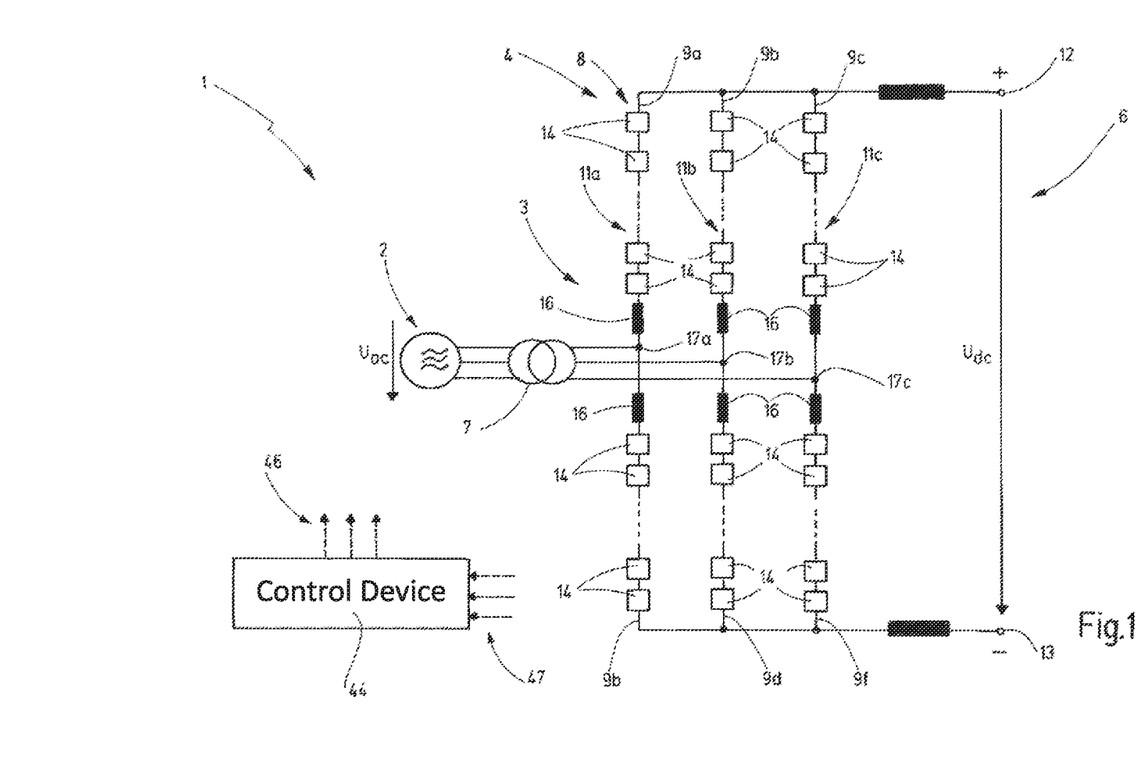
FIG. 1 shows an exemplary system with a modular multilevel converter, which is suitable for unidirectional power transmission, for coupling a drive machine or another load with a grid or the like, to illustrate an exemplary application in the form of a simplified block diagram.

FIG. 1 contains a very simplified representation of a system 1, which can, for example, illustrate a high voltage or medium voltage direct current distribution system for electrical energy transmission at high or medium direct voltage. The system 1 comprises here for example a three-phase AC voltage source 2, which can for example be an electric energy supply grid, an electrical alternating current (AC) machine, an AC generator, a wind power plant or the like. To the AC voltage source 2 an electrical converter 4 is connected with its AC voltage side 3. It is used to convert the alternating voltage that is present at its AC voltage side 3 into a direct voltage present at its DC voltage side 6 or vice versa. The connection of the converter 4 to the AC voltage source 2 can occur optionally via a transformer 7.

Such a system for example could be used for the coupling of direct voltage applications to alternating current grids, such as photovoltaic or busbar systems with direct voltage or DC voltage grids. Such an arrangement can be used for a coupling of applications or electrical grids with AC voltage with an AC voltage grid, for example for pumped storage power stations, using generators, wind power plants or to drive electrical machines such as pumps and compressors as well as for coupling of electric alternating voltage grids. The DC voltage side 6 can be connected to a different electrical energy supply grid, for example through a direct current transmission installation not illustrated here. Further, such a system can also be designed as a so-called Back-to-Back system, in which the DC voltage side 6 can be connected directly with an electrical converter similar to the converter 4. For the transmission of electrical energy, the converter on the DC voltage side 6 can also be connected indirectly via a direct voltage transmission installation.

Depending on the application, the converter 4 comprises at least a first converter 8, which can be operated here as rectifier to convert an alternating voltage $U_{ac}$ of the AC voltage source 2 to a direct voltage $U_{dc}$ on the output side. Optionally, the converter 4 could comprise a further converter not illustrated here, which converts the voltage $U_{dc}$ into a suitable alternating voltage. Conversely, the converter 8 could be used as inverter, to convert the direct voltage $U_{dc}$ into an alternating voltage to feed into the AC voltage grid 2. It is understood that the function of the converter or the converters reverses if the flow of energy occurs toward the electric energy supply grid or the voltage sink 2.

As can be seen from FIG. 1, the converter here comprises six converter branches 9a-9f, of which each two, an upper and a lower 9a, 9b or 9c, 9d or 9e, 9f form a respective phase branch 11a, 11b or 11c. Each phase branch 11a, 11b, 11c extends between a positive power rail or a positive DC voltage connection ("+") 12 of the converter 8 and a negative power rail or a negative DC voltage connection ("−") 13.

As further shown in FIG. 1, each converter branch here comprises a series connection of multiple converter submodules or modular switches 14 connected in series. The controllable direct voltage $U_{dc}$ at the DC voltage connections 12, 13 of the converter 8 can be dynamically changed via the switching states of the individual converter submodules 14. The number of converter submodules 14 thereby determines the available number of converter switching states, which allow a fine voltage grading and a voltage form of high quality as well as high voltage levels up to the range of the high-voltage direct current (HVDC) transmission. The converter 8 is therefore a modular multilevel or multi-point converter, which is also known as MMC or M2C.

In practice, different configurations for the submodules 14 are known, which are suitable for different applications. For example, so-called half bridges are predominantly used, which essentially represent a series connection of two power semiconductor switches each with an antiparallel connected freewheel diode, whereby a capacitor as energy storage is connected in parallel to the series connection. Submodule configurations in the form of full or H bridge circuits, asymmetric H bridge circuits or mixed configurations are also known. A configuration of a submodule 14 according to embodiments of the invention for use in the converter 8 is explained in more detail below in connection with FIG. 2.

In the converter branches 9a-9f two circuit current limiting inductances 16 can be provided, each supporting a decoupling of the converter branches from each other. At the connection point between the associated converter branches 9a, 9b or 9c, 9d or 9e, 9f the respective AC voltage connections 17a, 17b, 17c of the converter 8 are led out, which are connected to the AC voltage source 2. The direct voltage side connections of the first, most upper submodules 14 of the converter 8 are connected with each other and with the positive power rail 12. Similarly, the direct voltage side connections of the last, lowest submodules 14 are connected with each other and with the negative DC voltage connection 13. Between the power rails 12, 13 the direct voltage $U_{dc}$ of the DC voltage intermediate circuit is present, which can be a high voltage, for example, over 100 kV.

Figure 2:
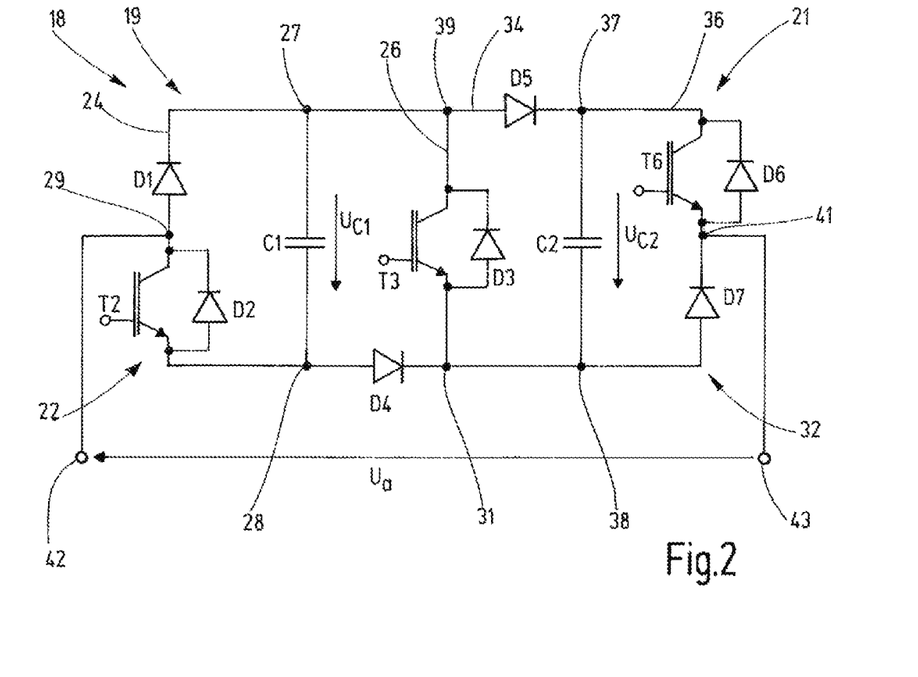
FIG. 2 shows a circuit diagram of a reduced H bridge circuit-based interconnected double submodule, which can be used in the modular multilevel converter according to FIG. 1.

FIG. 2 shows in the form of a simplified circuit diagram a topology of a double submodule or modular switch 18 according to embodiments of the invention, as it can be in use in the modular multilevel converter 8 according to FIG. 1, in accordance with an embodiment of the invention. It should be noted that the double submodule 18 can be used instead of two in series or parallel connected half, full, or H bridges or other submodules. In this respect, where appropriate, only half the number of double submodules 18 according to embodiments of the invention may be required for each converter branch 9*a*-*f* in comparison to the number of conventional submodules 14.

The double submodule 18 according to embodiments of the invention is essentially based on an asymmetric H bridge module, as it is described in DE 10 2010 046 142 A1 and where compared to a full bridge module, a power semiconductor is replaced each with a diode in every bridge branch. Referring to FIG. 2, the double submodule 18 essentially comprises a first submodule 19 and a second submodule 21, each of which is based on an asymmetric H bridge, yet are connected and interconnected in a certain way according to embodiments of the invention.

In particular, the first submodule 19 comprises a bridge circuit 22 and a capacitor C1 connected in parallel to the bridge circuit 22. The bridge circuit 22 is fitted with two parallel bridge branches 24, 26, which are connected in parallel to each other between a first and a second direct voltage node 27, 28. The first bridge branch 24 comprises a series connection of a first diode D1 and a first power semiconductor switch T2 to which an antiparallel or opposing parallel connected freewheeling diode D2 is associated. The freewheeling diode D2 is used to protect the corresponding power semiconductor switch against impermissible overvoltages or blocking voltages, when the power semiconductor switch T2 is open. Under certain circumstances, it may also be useful that this diode also conducts an operating current.

The freewheeling diode D2 and the diode D1, which is connected in series to it, are aligned in the direction of flow from the second, in FIG. 2 lower direct voltage node 28 to the first, upper direct voltage node 27 of the first submodule 19. Further, the diode D1 is connected with its cathode to the first direct voltage node 27 and with its anode to the collector of the as IGBT (insulated-gate bipolar transistor) formed power semiconductor switch T2 and to the cathode of the freewheeling diode D2. The connection point between the unit from the power semiconductor switch T2 and the freewheeling diode D2 and the diode D1 is designated here with 29.

Similarly, the second bridge branch 26 comprises a series connection from a second power semiconductor switch T3, which is associated with an antiparallel connected freewheeling diode D3 and a second diode D4. In turn, the diode D4 and the freewheeling diode D3 are aligned in the flow direction of the second direct voltage node 28 to the first direct voltage node 27 of the module 19. However, the diode D4 is connected here with its anode to the second direct voltage node 28 and with its cathode to the emitter of the likewise as IGBT formed power semiconductor switch T3 and to the anode of the freewheeling diode D3. The connection point between the diode D4 and the unit from the power semiconductor switch T3 and the freewheeling diode D3 is designated here with 31. The diodes D1, D4 are thus diagonally arranged to each other in the bridge circuit 22, which is also the case with the power semiconductor element units T2/D2 and T3/D3.

The capacitor C1 as energy storage of the first submodule 19 is connected between the direct voltage nodes 27, 28. In particular, the capacitor C1 is, for example, a unipolar capacitor, which serves as a direct voltage intermediate circuit capacitor of the submodule 19.

The power semiconductor switches T2, T3 are controllable switches which, as already mentioned, are, in an embodiment, formed by IGBTs here. In principle, also other transistors that can be switched off, such as field effect transistors, gate turn-off thyristors (GTOs) or other similar electronic components, can be used.

The second, in FIG. 2 right submodule 21 comprises in a similar way a bridge circuit 32 and a capacitor C2, which is connected in parallel to the bridge circuit 32. The bridge circuit 32 is here also formed as asymmetric H bridge circuit with two parallel bridge branches 34, 36, which are connected in parallel to each other between a first, in FIG. 2 upper direct voltage node 37 and a second, lower direct voltage node 38 of the second submodule 21. The first bridge branch 34 comprises a series connection from a first power semiconductor switch, which is formed here by the power semiconductor switch T3 and with which the antiparallel freewheeling diode D3 is associated, and a first diode D5. The diode D5 and the freewheeling diode D3 are aligned in forward direction of the second direct voltage node 38 to the first direct voltage node 37 of the submodule 21. In addition, the cathode of the diode D5 is connected to the first, upper direct voltage node 37, while the anode of the diode D5 is connected with the cathode of the freewheeling diode D3 and with the collector of the power semiconductor switch T3. The connection point between the diode D5 and the unit from the power semiconductor switch T3 and the associated freewheeling diode D3 is designated with 39 in FIG. 2.

In a similar way, the second bridge branch 36 of the second submodule 21, in an embodiment, comprises a series connection of a likewise as IGBT formed second power semiconductor switch T6, to which a freewheeling diode D6 is connected antiparallel, and a second diode D7. The diode D7 and the freewheeling diode D6 are also aligned in forward direction from the second direct voltage node 38 to the first direct voltage node 37 of the submodule 21. The diode D7 is connected with its anode to the second direct voltage node 38 and with its cathode to the emitter of the power semiconductor switch T6 and the anode of the freewheeling diode D6. The connection point between the diode D7 and the unit from the power semiconductor switches T6 and the freewheeling D6 is here designated with 41.

The capacitor C2 is connected in parallel to the two bridge branches 34, 36 between direct voltage nodes 37, 38. In an embodiment it is a unipolar capacitor and serves as DC voltage intermediate circuit capacitor of the second submodule 21.

According to embodiments of the invention the two submodules 19, 21 are connected and interconnected with each other such, that the second power semiconductor switch T3 with the corresponding freewheeling diode D3 is part of the second bridge branch 26 of the first submodule 19 as well as part of the first bridge branch 34 of the second submodule 21. In particular, the connection point 31 of the second bridge branch 26 of the first submodule 19 is here directly connected with the second direct voltage node 38 of the second submodule 21. Further, the connection point 39 of the first bridge branch 34 of the second submodule 21 is here directly electrically connected with the first direct voltage node 27 of the first submodule 19. Compared to a series of two submodules based on asymmetric H bridges, a power semiconductor switch with the optional associated freewheeling diode D3 per double submodule 18 can be saved here.

The connection point 29 between the first diode D1 and the first power semiconductor switch T2 of the first submodule 19 forms a first module connection 42 of the double submodule 18, while the connection point 41 between the second diode D7 and the second power semiconductor switch T6 of the second submodule 21 forms a second module connection 43 of the double submodule 18. The illustrated embodiment of the double submodules 18 in FIG. 2 can be connected in series with each other via module connectors 42, 43 to form a modular multilevel converter, e.g. the converter 8 according to FIG. 1 with any number of levels.

As already mentioned, the two capacitors C1 and C2 of the two submodules 19, 21 are provided as DC voltage intermediate circuit capacitors. The direct voltage $U_{C1}$ or $U_{C2}$ on the capacitor C1 or C2 is due to the circuit of diodes D1, D4, D5, D7 and the freewheeling diodes D2, D3, D6 always positive and can vary depending on the design and application, for example, between some hundred volts and some kV. The supply voltage $U_a$ between the second 43 and the first module connection 42 can essentially have the values 0, $U_{C1}$, $U_{C2}$, $U_{C1}+U_{C2}$ as well as a value that comes about, when the capacitors C1 and C2 are connected in parallel to each other. The voltage $U_{C1}$ or $U_{C2}$ on each capacitor C1 or C2 can be larger or smaller. A current $I_a$ can in principle, depending on the control, flow in both directions through the double submodule 18. However, a unidirectional operation in which the current $I_a$ flows from the first module connection 42 to the second module connection 43. By convention, a current $I_a$, which flows in the direction from the first 42 to the second module connection 43, should be designated as positive current, whereas the reverse current should be designated as negative current.

Again referring to FIG. 1, a control device 44 can further be seen, which is provided to control the operation of the converter 8 appropriately based on the present operating conditions. For the sake of clarity, the control paths are indicated in FIG. 1 by dashed arrows 46, which emerge from the control device 44. In particular, the control device 44 controls the power semiconductor switches T2, T3, T6 of the double submodules 18 of all converter branches 9a-f appropriately, to generate from the grid or alternating voltage U or their transformed voltages at the AC voltage connections 17a-c the desired DC voltage $U_{dc}$ between the DC voltage connections 12, 13 of the converter 8 or vice versa. The switching signals which are suitable for this are determined by the control device 44 depending on the current operating conditions or parameters, which are continuously measured or determined in operation by a monitoring device not shown here. Measuring paths are indicated by dashed arrows 47 in FIG. 1, which enter in the control device 47. For example, the phase voltages and/or the phase currents at the AC voltage connections 17a-c, the branch currents in the converter branches 9a-f and/or the DC link current in the DC voltage intermediate circuit at the DC voltage connections 12, 13, the potentials at the DC voltage connections 12, 13 to measure the DC voltage intermediate circuit voltage $U_{dc}$ and/or other values can be measured directly. Also, voltages and currents within the double submodules 18 can be determined. Some values can be determined from directly measured values with well-known relations for electrical currents and voltages.

Figure 3:
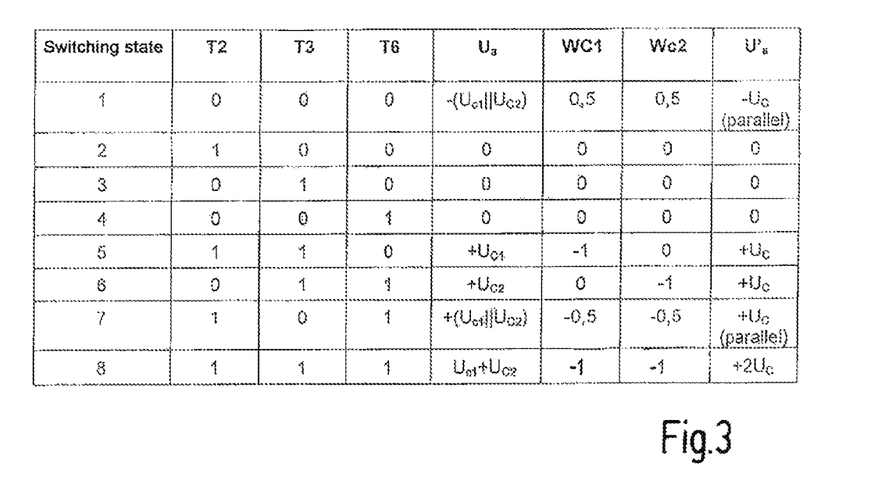
FIG. 3 shows a table, which illustrates the switching states of the double submodules according to FIG. 2 with the resulting output voltages.
Figure 4:
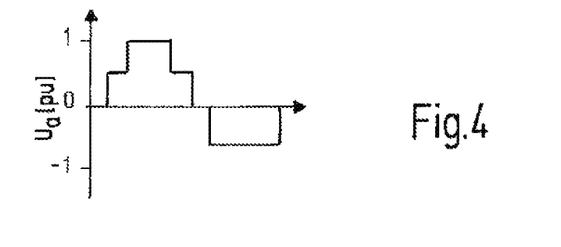
FIG. 4 shows a representation of the output voltage characteristic $U_a$[pu], standardized, based on the maximum achievable output voltage, for the double submodule according to FIG. 2.
Figure 5A:
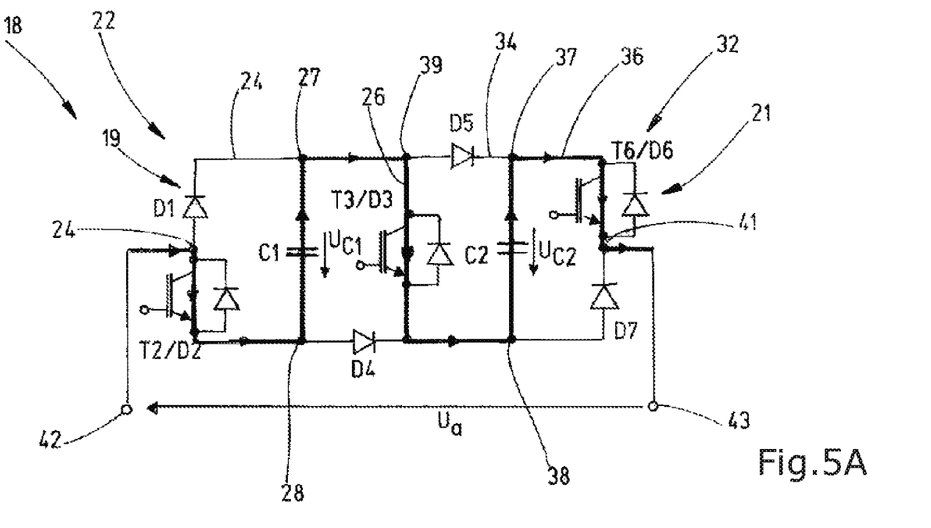
FIGS. 5A and 5B show a circuit diagram of the double submodule according to FIG. 2, illustrating current flows at different switching states.
Figure 5B:
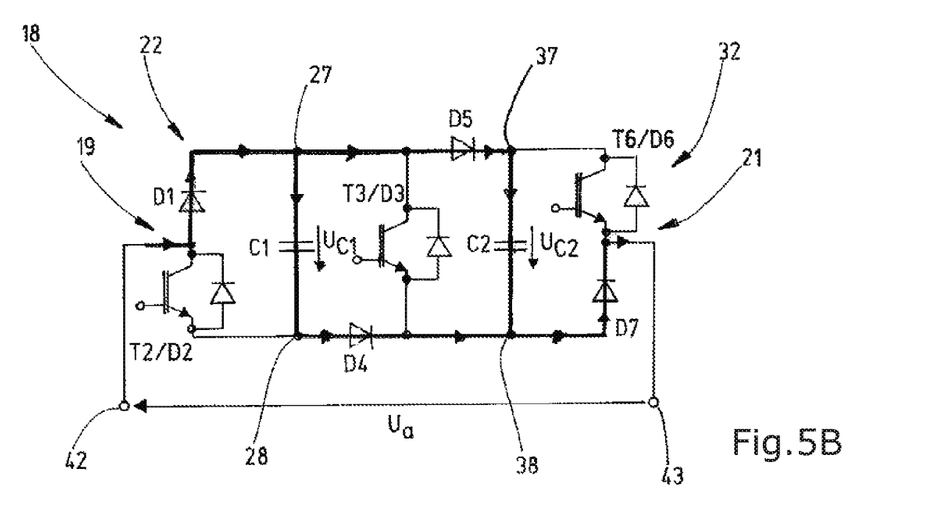

Reference is now made to FIGS. 3 to 5 for further elaboration of the functioning and beneficial effects of the modular multilevel converter 8 and the double submodules 18 according to embodiments of the invention. FIG. 3 shows a table that illustrates the switching states of the double submodule 18 depending on the control of the power semiconductor switches T2, T3 and T6 for the positive creation of the current $I_a$ by the double submodule 18. A "0" for a particular switch T2, T3, T6 means that the power semiconductor switch is switched off or controlled not conductive, while a "1" indicates that the power semiconductor switch is switched on or controlled conductive.

Also entered is the output voltage $U_a$, which results between the second and the first module connection 43, 42 of the double submodule 18 for the relevant switching state. As mentioned above, the voltage $U_a$ can have the values 0, $U_{C1}$, $U_{C2}$, $U_{C1}+U_{C2}$ as well as a value $U_{C1} \| U_{C2}$, which is present at a parallel circuit of capacitors C1 and C2. Also shown is a voltage $U'_a$, which is present, if it is assumed that the voltages at the capacitors C1, C2 have essentially the same value $U_{C1}=U_{C2}=U_C$.

Possible output voltages for the double submodule 18 are shown in the form of a simplified characteristic $U_a[pu]$, standardized to the maximum attainable output voltage (per unit, pu), shown in FIG. 4. A bipolar voltage results, much like with full bridge based submodules, but with a total of four voltage levels. The maximum positive voltage in FIG. 4 appears in the switching state 7 of the table according to FIG. 3, while the positive intermediate level of the voltage in FIG. 4 corresponds to the switching states 5, 6 and 7. The negative voltage level in FIG. 4 corresponds to the switching state 7 with capacitors C1, C2 connected in parallel.

As already mentioned, in the operation a current is conducted through the double submodule 18 only in the positive direction. Also, entered in the table according to FIG. 3 are two columns with the heading WC1 or WC2, which illustrate the flow of energy to and from the respective capacitor C1 or C2. A positive value indicates that the respective capacitor absorbs energy by getting charged. A negative value indicates that the particular capacitor is discharged or emits energy. The positive or negative value "1" indicates that the capacitor absorbs or emits the full energy, while the value 0.5 indicates that the capacitor absorbs or emits idealized half of the energy when the currents in the parallel paths ideally divide symmetrically. A "0" indicates that the capacitor essentially retains its energy, whereby the current flow is conducted to bypass it.

As can be seen from FIG. 3, the energy content of the capacitors C1 and C2 of the double submodule 18 can be influenced by appropriate switching states. This can be used, for example, to affect a so-called "balancing" of the energy content of the capacitors C1, C2 in order to adapt and align their voltages to a corresponding reference or mean value.

As further shown in FIG. 3, in the switching states 1 and 7 the capacitors C1, C2 can be connected in parallel to each other. This can also be used for "balancing" the capacitor voltages or energy content.

Apart from that, the double submodule 18 offers redundant switching states, with which the desired supply voltage $U_a$ can be achieved. For example, a zero voltage in the switching states 2, 3 or 4 can be achieved, if only one of the power semiconductor switches T2, T3 and T6 is switched on. In this respect, the double submodule 18 as such and the converter 8 altogether can continue to be operated, even if one of these switches has a short circuit condition in the event of a fault, as this is typically the case in semiconductor devices in press pack design. A redundancy is also given in the switching states 5 and 6, in which the output supply voltage $U_a$ corresponds to the simple voltage $U_C$ of one of the capacitors C1 and C2.

FIGS. 5a and 5b show the circuit arrangement of the double submodule 18 according to FIG. 2, illustrating the current flows through the double submodule 18 in different switching states, which result in different supply voltages between the module connections 43, 42. FIG. 5a illustrates a case in which the maximum supply voltage $U_a = U_{C1} + U_{C2}$ is present between the module connections 43, 42. This can be achieved, for example, in the switching state 8 according to FIG. 3, when all the power semiconductor switches T2, T3 and T6 are switched on. The current then flows from the first module connection 42 via the power semiconductor switch T2, through the capacitor C1, the power semiconductor switch T3, the capacitor C2 and the power semiconductor switch T6 to and beyond the second module connection 43. Although, in this switching state, the maximum number of power semiconductor switches is switched on, only three switches T2, T3 and T6 are located in the current path, which reduces the power semiconductor switches in the current path as compared to corresponding switching states of double submodules based on full bridges or asymmetrical full bridges, and this consequently means a reduction in the associated conduction losses.

FIG. 5b shows the case in which the positive current $I_a$ flows through the double submodule 18 to the second module terminal 43 bypassing all the power semiconductor switches T2, T3 and T6. This operating mode results in the switching state 1 of FIG. 3, in which all the power semiconductor switches T2, T3 and T6 are switched off (and alternatively in the switching state 7). The current $I_a$ flows from the first module connection 42 through the first diode D1 and is then divided into two parallel current paths, one of which flows from the first direct voltage node 27 of the first submodule 19 via the first diode D5 of the second submodule 21, through capacitor C2 to the second direct voltage node 27 of the second submodule 21. The second partial current flows via the capacitor C1 and through the second diode D4 of the first submodule 19 to the direct voltage node 38, where it combines with the first partial current. The total current then flows through the second diode D7 of the second submodule 21 to the second module connection 43.

Thus, in this operating state, the capacitors C1, C2 are connected in parallel with one another, which on the one hand makes balancing their energy contents possible, as already mentioned, and on the other hand results in an increased resulting capacitance of the parallel-connected capacitors C1, C2, which could be used, for example, to reduce the amount of stored electrical energy by reducing the intermediate circuit capacitances of C1, C2 of the double submodules in the modular multilevel converter 8. For a certain required capacitance at the DC voltage intermediate circuit of the converter 8, the capacitors C1, C2 of the double submodules 18 could be designed smaller. In addition to the reduction in the number of semiconductor devices, this also contributes to a further saving in the costs to produce the submodules and the converters.

The switching state 1 with the capacitors C1, C2 connected in parallel may be also advantageous in the event of a short circuit current driven by the alternating voltage flows through the double submodule in the positive flow direction. The control device 44 can detect such a fault by means of the measurement signals 47 and can control the double submodules 18 accordingly via the control paths 46 in order to switch off the power semiconductor switches T2, T3 and T6. The short circuit current is then conducted across the two parallel current paths with the capacitors C1 and C2 in each double submodule 18, whereby the capacitors C1, C2 are getting charged. A counter voltage $U_{C1}$ and $U_{C2}$ builds up at the capacitors, which counteracts the short circuit current and reduces the short circuit current or at least prevents it from increasing rapidly. The control device 44 can then, as required, actuate corresponding protective switches or circuit breakers on the alternating or direct voltage side in order to isolate the converter 8 from the short circuit fault or to disconnect it from the electrical grid 2. In any case, the components of the double submodules 18 or of the converter 8 can be largely protected against destruction.

Thus, a double submodule 18 is created that has a simple and low-cost design, which also provides the basis for low manufacturing and operating costs. A current and voltage characteristic can thus be achieved, which is suitable for many applications and which corresponds to those of other known submodules, but which allows additional functionalities. The number of semiconductor devices is reduced compared to comparable submodules based on full bridges. The number of power semiconductors in the current path is also reduced in many switching states compared to a series connection of full bridge variants, which reduces the conduction losses and the operating costs. Compared to other known double submodules, the number of power semiconductors is significantly reduced, whereby the operation of the double submodule is essentially designed for unidirectional current flow, as is suitable for most, in particular the relevant converter applications. Correspondingly, a simple and low-cost realization and efficient operation of a modular multilevel converter for different applications are also made possible.

In operation, considerable compensation currents must be prevented from flowing between the capacitors, which could result in additional losses in the capacitors or semiconductor power devices or even cause damage to the components. In embodiments, therefore, the capacitors C1 and C2 of the double submodule 18 are specifically selected to have an extremely small tolerance k in their capacitance. For this purpose, the tolerance k should be less than 3%. In an embodiment it is less than 1%. In particular implementations, a tolerance k of less than 1% can be achieved by sorting and suitable pairing of capacitors C1, C2 for a double submodule. In operation, the control device 44 can then ensure, by monitoring the control flows and suitable control of the power semiconductor switches T2, T3 and T6 of the double submodules 18, that the voltages on the capacitors differ only minimally, in any case by maximally a first threshold value Th1. The first threshold value can also be 1% or less, so that no or only very small compensation currents flow between the capacitors C1, C2 and these can readily be connected in parallel.

In addition, or as an alternative to this, the control device can be configured to control or regulate the voltages $U_{C1}$ or $U_{C2}$ over the capacitors C1, C2 in such a way that, when switching to a switching state with a parallel circuit of the capacitors C1, C2, e.g. in the switching state 1 or 7 in the table according to FIG. 3, the voltage $U_{C1}$ over the upstream capacitor C1 of the double submodule in the current flow direction according to FIG. 2 is smaller than the voltage $U_{C2}$ over the downstream capacitor C2 in the current flow direction. This makes it possible to prevent high compensation currents flowing during the transition to the parallel circuit.

Figure 6:
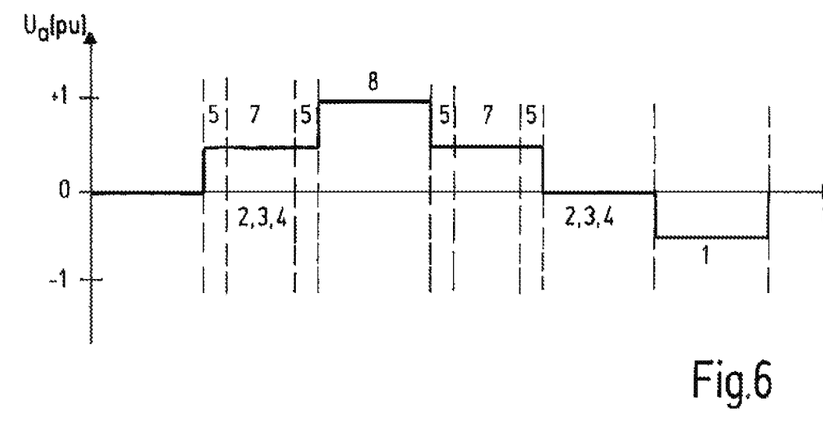
FIG. 6 shows an exemplary switching sequence for the double submodule of FIG. 2, illustrating exemplary switching states according to the table of FIG. 3 and the resulting standardized supply voltages $U_a$[pu]

Referring to FIG. 6, which illustrates an exemplary switching sequence with the resulting standardized supply voltages $U_a$[pu], the upstream capacitor C1, which is connected to the anodes of the diodes D5 and D4 connected between the direct voltage nodes 27, 37 or 28, 38, can be charged less before the switching states 1 and 7 than the downstream capacitor C2, which is connected to the cathodes of the diodes D5 or D4. This can be achieved, for example, by the fact that in the transition from one of the states 2, 3, 4 (with the supply voltage $U_a$=0) to the switching state 7 ($U_a$=$U_c$) there is first a short switch to the switching state 5 in order to slightly discharge the capacitor C1. The difference of the voltages $U_{C1}$ and $U_{C2}$ of the two capacitors C1 and C2 is thus set to a value which is less than a first threshold value Th1 of, for example, 20 volts and greater than a second threshold value Th2 of, for example, 5 volts, an exemplary threshold range being 5-10 volts. Both diodes D4 and D5 are thus blocked. During the subsequent transition to the switching state 7, the capacitor C1 is charged slowly until the diodes D4 and D5 become conducting, so that the parallel connection of the capacitors C1, C2 then takes place gently, without inadmissible compensation currents. Damping resistances for residual compensation currents are not required.

Likewise, after the switching state 7 ($U_a$=$U_c$) and before the transition to one of the states 2, 3, 4 ($U_a$=0), it can be briefly switched to the switching state 5 in order to force the desired condition $U_{C1}$<$U_{C2}$, in order to obtain a gentle subsequent transition to the switching state 1.

Figure 7:
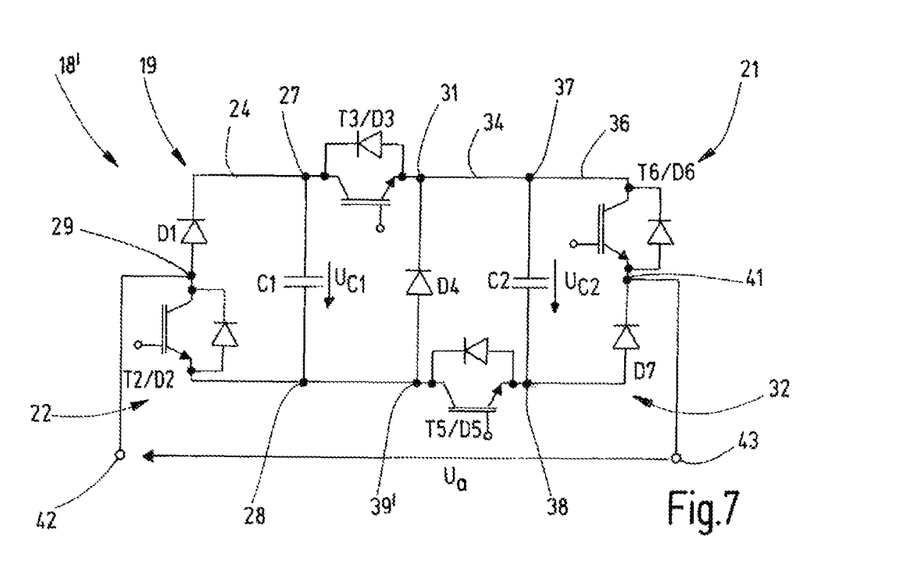
FIG. 7 shows a circuit diagram of a reduced H bridge circuit-based interconnected double submodule, which can be used in the modular multilevel converter according to FIG. 1.

FIG. 7 shows a further embodiment of a double submodule 18' according to embodiments of the invention. To the extent that the design and/or the function corresponds to the above-described first embodiment of the double submodule 18 according to FIGS. 2-5, reference is made to the above description on the basis of the same reference numerals.

The embodiment of the double submodule 18' according to FIG. 7 differs from the one according to FIGS. 2-5 in particular in that, instead of the unit comprising the power semiconductor switch T3 and the freewheeling diode D3, the diode D4 is now shared by both the first submodule 19 and the second submodule 21. As the second diode, the diode D4 is thus both part of the second bridge branch 26 of the first submodule 19 and also as the first diode part of the first bridge branch 34 of the second submodule 21. The second power semiconductor switch T3 and its associated freewheeling diode D3 are merely part of the first submodule 19 and connected between the first direct voltage node 27 and the connection point 31 of the first submodule 19. The diode D4 is connected in the flow direction from the second direct voltage node 28 of the first submodule 19 to the connection point 31, which is directly connected to the first direct voltage node 37 of the second submodule 21. Furthermore, the anode of the common diode D4 is connected to the collector of a power semiconductor switch T5 at a connection point 39' of the second submodule 21, which is directly connected to the second direct voltage node 28 of the first submodule 19. The emitter of the power semiconductor switch T5 is directly connected to the second direct voltage node 38 of the second submodule 21. A freewheeling diode D5 is connected antiparallel to the power semiconductor switch T5.

Figure 8:
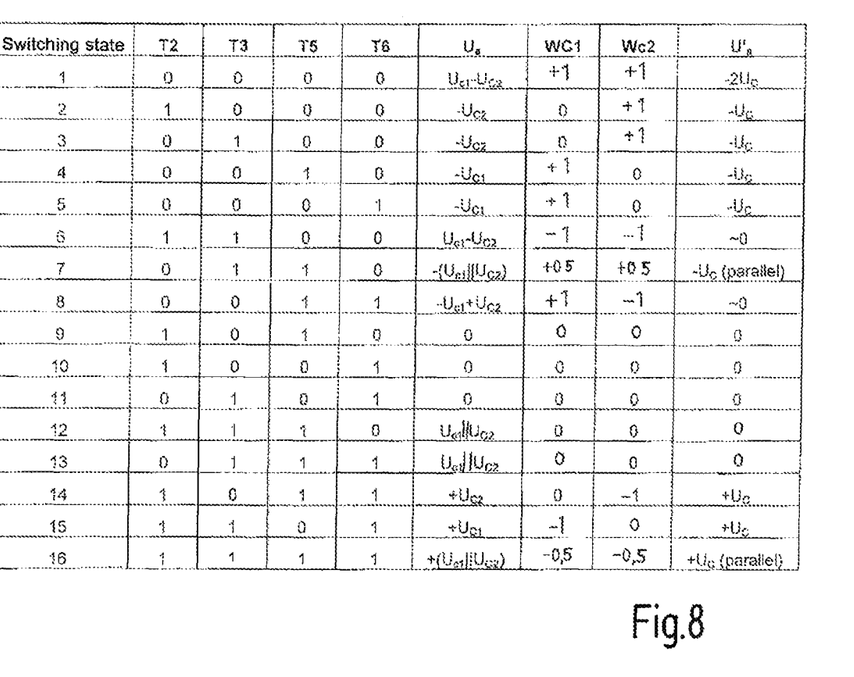
FIG. 8 shows a table, which illustrates the switching states of the double submodule of the embodiment according to FIG. 7 with the resulting output voltages, similar to FIG. 3.
Figure 9:
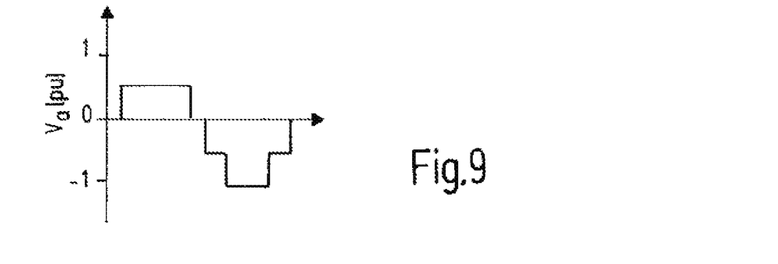
FIG. 9 shows a representation of the output voltage characteristic $U_a$[pu], standardized, based on the maximum achievable output voltage, for the double submodule of the embodiment according to FIG. 7, in a representation similar to FIG. 4.

Various realizable switching states of the double submodule 18' of the embodiment according to FIG. 7 are listed in FIG. 8, while the output voltage characteristic is shown in FIG. 9. Again, the generation of an at least four-level output voltage is possible, with the positive and negative voltage levels being interchanged in comparison with the embodiment according to FIG. 2. Many redundant switching states are also possible, with which either the module connection voltage $U_a$=0 or a voltage $U_{C1}$, $U_{C2}$, which corresponds to the voltage of one of the capacitors C1 or C2, a voltage $U_{C1}$+$U_{C2}$, which corresponds to the sum voltage of the capacitors, or a voltage $U_{C1}$∥$U_{C2}$ can be generated, which results from the parallel circuit of the capacitors. This is the case, for example, in the switching states 7 and 16. The switching states for the parallel circuit of the capacitors also require a sufficiently good balancing of the capacitor voltage so that no high compensation currents can cause damage. Accordingly, it must also be ensured by suitable selection of the switching states that both capacitor voltages are within predetermined limit values before they are transferred into a switching state for parallel operation. The voltage of the second capacitor, which is connected via two diodes in the flow direction with the direct voltage nodes of the first capacitor, is slightly lower before a switching state in parallel operation. This ensures that both diodes are reliably blocked and that switching on of the IGBTs between the direct voltage nodes of both capacitors before parallel operation occurs with sufficiently low compensating currents.

After a pulse block has occurred, this double submodule type is switched to the switching state 1, in which all the power semiconductor switches T2, T3, T5 and T6 are switched off and the current flow occurs through both series connected capacitors. In the event of a fault, this switching state causes a counter voltage which counteracts the short circuit current and reduces it or at least prevents a further rapid increase thereof.

The switching states 6 and 8 can, for example, be used within certain limits for balancing the energy contents, in the zero state with respect to the output voltage, of the capacitors C1, C2.

Figure 10A:
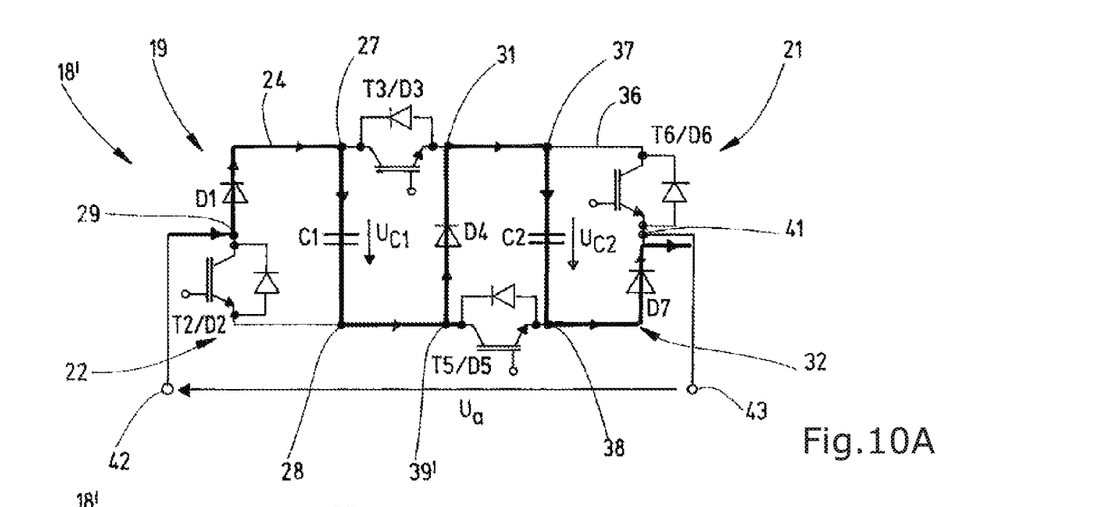
FIGS. 10A and 10B show a circuit diagram of the double submodule of the embodiment according to FIG. 7, illustrating current flows at different switching states of the double submodule, similar to FIGS. 5A and 5B.
Figure 10B:
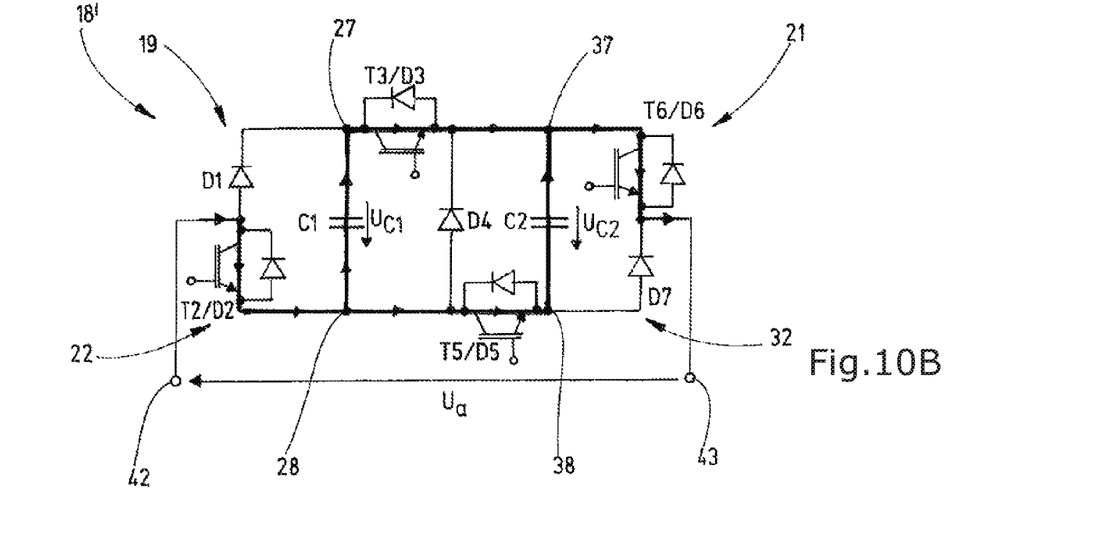

FIGS. 10a and 10b show the circuit arrangement of the double submodule 18' of the embodiment according to FIG. 7, illustrating the current flows through the double submodule 18 in similar representations as in FIGS. 5a and 5b for the double submodule according to FIG. 2. FIG. 10a shows the current path in the case in which all the power semiconductor switches T2, T3, T5, T6 of the double submodule 18' are switched off (switching state 1 in FIG. 8), whereby the current $I_a$ successively flows through both capacitors C1 and C2 and charges them. FIG. 10b shows the case in which all the power semiconductor switches T2, T3, T5 and T6 are switched on (switching state 16 in FIG. 8), whereby the current $I_a$ divides into two current paths, each of which goes through one of the capacitors C1, C2. In other words, the capacitors C1, C2 are connected in parallel to one another as already mentioned in this case above.

Figure 11:
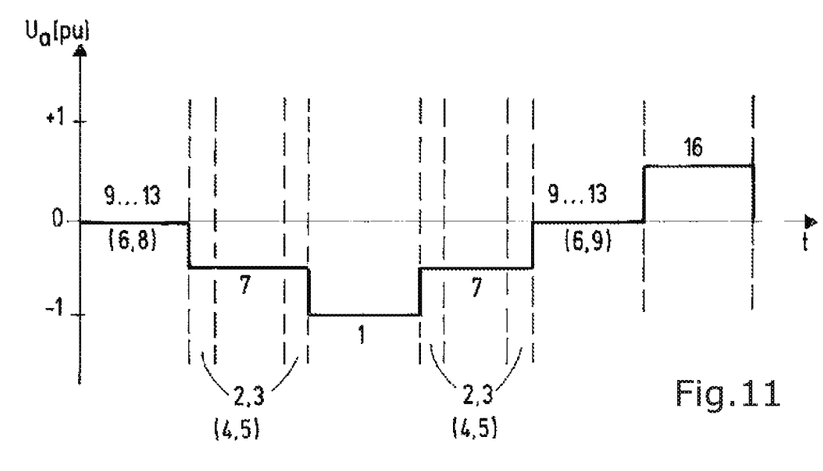
FIG. 11 shows an exemplary switching sequence for the double submodule according to FIG. 7, illustrating exemplary switching states according to the table of FIG. 8 and the resulting standardized supply voltages $U_a$[pu].

FIG. 11 shows an exemplary switching sequence for the double submodule 18' according to FIG. 7, similar to the illustration according to FIG. 6 for the double submodule 18 according to FIG. 2. As can be seen from FIG. 11, prior to a parallel circuit of the capacitors C1, C2, the downstream capacitor C2 can be slightly charged, for example, by the switching sequence 2 or 3 of the table in FIG. 8 in order to reduce the difference in the voltages $U_{C2}$ and $U_{C1}$ of the two capacitors C1 and C2 to a value which is smaller than the first threshold value Th1 of, for example, 20 volts and greater than the second threshold value Th2 of, for example, 5 volts, or is in the range of 5-10 volts. Alternatively, the upstream capacitor C1 can be slightly discharged, for example, by the switching sequence 4 or 5 of the table in FIG. 8. In any case, inadvertently high compensation currents during the parallel circuit can be avoided in the transition to the switching state 7 with parallel circuit of the capacitors C1, C2.

In the case of both double submodules 18 and 18', different measures can be taken individually or in combination with one another in order to ensure that switching states, in which the capacitors C1, C2 are connected in parallel, occur, if possible, with a very small difference in the capacitor voltages $U_{C1}$, $U_{C2}$, in order to keep compensating currents sufficiently low at the beginning of the switching state of the parallel circuit. As explained above, this can be done with a suitable control of the double submodule 18, 18', in particular, with certain switching states directly before the switching states of the parallel circuit, as shown in FIGS. 6 and 11.

In addition, a very low tolerance of the capacitor capacitance or nearly identical capacitor capacitances C1, C2 within a double submodule 18, 18' facilitate that the capacitor capacitances $U_{C1}$, $U_{C2}$ in switching states of a series connection only slightly diverge during operation of consecutive periods within the corresponding switching state (e.g. the switching state 8 in FIG. 6 or the switching state 1 in FIG. 11). The difference of the capacitor voltages $U_{C1}$, $U_{C2}$ is then before a subsequent transition into a switching state with a parallel circuit within the specified limits, so that compensating currents remain small enough without an additional switching state for balancing having to be done.

Another option provides a slightly different sizing of the capacitances C1, C2 of capacitors of a double submodule 18, 18'. For example, the first capacitor C1 in the current flow direction can have a slightly smaller capacitance, which is, in an embodiment, smaller by 1% to 2% than that of the second, downstream capacitor C2. Thus, it can be ensured that in switching states of a series connection of both capacitors of a double submodule at a specified current flow direction the capacitor C1 or C2, whose direct voltage node is connected through diodes (D4, D5 in FIG. 2 or D3, D5 in FIG. 7) in flow direction with the other capacitor C2 or C1, does lose voltage to a greater extent, so that during a subsequent parallel circuit compensating currents over these diodes are sufficiently low.

In addition, the use of a stepped switch on of the IGBTs T3, T5 in the double submodule 18' according to FIG. 7 is possible to bring about, where appropriate, the switching state 7 of the parallel circuit of the capacitors C1, C2 (see FIG. 10b) with increased damping resistance. In doing so, the IGBTs T3 and T5 with a gate voltage well below the normal value of about +15V, e.g. in the range of +3 to +10V, can be switched on in a first step, whereby they can be operated in the active range with desaturating behavior in comparison to normal operation. The components have a higher resistance in this area compared to the normal switching operation and can dampen or reduce within certain limits the compensating currents during the transition of the double submodules 18' in switching states with a parallel circuit of the two capacitors C1, C2. After the transition to the parallel operation of both capacitors C1, C2, the gate voltage can be raised to the usual value of typically +15V in order to continue to operate the semiconductor switch with significantly reduced conduction losses. Switching off the IGBTs can be done without an additional positive lower gate voltage level directly on the negative gate voltage intended for blocking the switch.

Furthermore, the statements relating to the functioning and the benefits derivable thereof, as set forth above in connection with the embodiment according to FIG. 2, apply to the double submodule 18' of the embodiment according to FIG. 7 accordingly. In particular, through the shared use of the diode D4 by both submodules 19, 21, the number of required semiconductor devices and the costs for the realization of the double submodule 18' compared to comparable series and/or parallel circuits of submodules is reduced, and also the conduction losses in comparison to a series connection of full bridges and the associated operating costs are decreased by a reduced number of energized power semiconductor switches in the most switching states.

A double submodule 18, 18' for a modular multilevel converter 8 is created, which comprises a first 19 and a second submodule 21 coupled to the first. Each submodule 19; 21 comprises an asymmetric H bridge circuit 22; 32 with two parallel bridge branches 24, 26; 34, 36, which are connected between a first and a second direct voltage node 27, 28; 37, 38 of the submodule 19; 21, whereby each bridge branch 24, 26; 34, 36 is formed by means of a series connection from a controllable power semiconductor switch T2, T3, T5, T6 and a diode D1, D4, D5, D7. A storage capacitor C1, C2 is connected in parallel to the asymmetric H bridge circuit 22; 32 between the first and the second direct voltage node 27, 28; 37, 38 of the submodule 19; 21. The first and the second submodule 19; 21 are interconnected in such a way that a power semiconductor switch T3 or a diode D4 is part of a bridge branch 26 of the first submodule 19 as well as part of a bridge branch 34 of the second submodule 21. A modular multilevel converter 8, which comprises a series connection of such double submodules 18, 18' in each of its converter branches 9a-f, is also disclosed.

What is claimed is:

1. A double submodule for a modular multilevel converter comprising:
   a first submodule and a second submodule coupled to the first submodule, wherein each submodule comprises:
   an asymmetric H bridge circuit having a first and second bridge branch (i) arranged in parallel, and (ii) connected to each other between a first and a second direct voltage node of the submodule, wherein each bridge branch comprises (i) a first diode and (ii) a series connection from a controllable power semiconductor switch associated with an antiparallel freewheeling diode; and
   a capacitor, which is connected in parallel to the asymmetric H bridge circuit between the first and the second direct voltage node of the submodule;
   wherein the first and the second submodule share one common power semiconductor switch and are interconnected via (i) a connection between the first diode of the first bridge branch of the second submodule and the common power semiconductor switch and (ii) a connection between the first diode of the second bridge branch of the first submodule and the common power semiconductor switch; and
   wherein when all of the power semiconductor switches are switched off, a current (i) flows through the first diode of the first submodule and (ii) splits into a first partial current and a second partial current, the first partial current flowing via the first voltage node of the first submodule, through the first diode of the second submodule and the capacitor of the second submodule, to the second voltage node of the second submodule, and the second partial current flowing via the capacitor of the first submodule, through the second diode of the first submodule, to the second voltage node of the second submodule, where it combines with the first partial current, both the first partial current and the second partial current bypassing all of the power semiconductor switches.

2. The double submodule according to claim 1, wherein the first bridge branch of the first submodule comprises a series connection from a first controllable power semiconductor switch and a first diode of the first submodule, wherein the cathode of the first diode is connected with the first direct voltage level of the first submodule, and the second bridge branch of the first submodule comprises a series connection from a second controllable power semiconductor switch and a second diode, wherein the anode of the second diode is connected with the second direct voltage level of the first submodule;

wherein the second submodule comprises a first bridge branch with a series connection from a first controllable power semiconductor switch and a first diode of the second submodule, wherein the cathode of the first diode is connected with the first direct voltage level of the second submodule, and a second bridge branch with a series connection from the second controllable power semiconductor switch and a second diode, wherein the anode of the second diode is connected with the second direct voltage level of the second submodule; and wherein a first connection point between the first power semiconductor switch and the first diode of the first bridge branch of the first submodule forms a first module connection of the double submodule and a second connection point between the second power semiconductor switch and the second diode of the second bridge branch of the second submodule forms a second module connection of the double submodule.

3. The double submodule according to claim 2, wherein the second power semiconductor switch of the second bridge branch of the first submodule forms at the same time the first power semiconductor switch of the first bridge branch of the second submodule.

4. The double submodule according to claim 3, wherein an antiparallel connected freewheeling diode is associated with the power semiconductor switches; and wherein the double submodule, except for the mentioned power semiconductor switches, diodes and capacitors, comprises no other active or passive electrical or electronic components and is free of damping resistors for damping of compensating currents.

5. The double submodule according to claim 2, wherein the second diode is formed by both the second bridge branch of the first submodule and the first bridge branch of the second submodule.

6. The double submodule according to claim 2, wherein when all of the power semiconductor switches are switched on, a current flows from the first module connection to the power semiconductor switch of the first submodule, through the capacitor of the first submodule, the common power semiconductor switch, the capacitor of the second submodule, and the power semiconductor switch of the second submodule, to the second module connection.

7. The double submodule according to claim 1, wherein the double submodule is configured to conduct a unipolar current between the first and the second module connection and to generate a bipolar supply voltage between the module connections when controlling the power semiconductor switches.

8. The double submodule according to claim 1, wherein the double submodule is configured to generate between module connections, when controlling the power semiconductor switches, a zero output voltage, an output voltage that corresponds to the voltage of one of the capacitors, a voltage that corresponds to the sum of the voltages of the capacitors, or a positive or negative output voltage, which is present at a parallel circuit of capacitors.

9. The double submodule according to claim 1, wherein the capacitor of the first submodule and the capacitor of the second submodule are connected in parallel.

10. A modular multilevel converter for conversion of an alternating voltage to a direct voltage or vice versa comprising:

at least one phase branch comprising an AC voltage connection and at least one DC voltage connection connected with a DC voltage intermediate circuit, wherein between each DC voltage connection and any AC voltage connection a converter branch is formed, wherein at least one double submodule is arranged in each of the converter branches, the double submodule comprising:

a first submodule and a second submodule coupled to the first submodule, each submodule comprising:

an asymmetric H bridge circuit having a first and second bridge branch arranged in parallel, each bridge branch being connected between a first and a second direct voltage node of the submodule, wherein each bridge branch consists of a series connection from a diode and a controllable power semiconductor switch and an antiparallel connection from the controllable power semiconductor switch to a freewheeling diode; and a capacitor, which is connected in parallel to the asymmetric H bridge circuit between the first and the second direct voltage node of the submodule;

wherein the first and the second submodule share a common power semiconductor switch and are interconnected via (i) a connection between the first diode of the first bridge branch of the second submodule and the common power semiconductor switch and (ii) a connection between the first diode of the second bridge branch of the first submodule and the common power semiconductor switch; and wherein when all of the power semiconductor switches are switched off, a current (i) flows through the first diode of the first submodule and (ii) splits into a first partial current and a second partial current, the first partial current flowing via the first voltage node of the first submodule, through the first diode of the second submodule and the capacitor of the second submodule, to the second voltage node of the second submodule, and the second partial current flowing via the capacitor of the first submodule, through the second diode of the first submodule, to the second voltage node of the second submodule, where it combines with the first partial current, both the first partial current and the second partial current bypassing all of the power semiconductor switches.

11. The modular multilevel converter according to claim 10, further comprising a number of phases corresponding to a number of phase branches, a first DC voltage connection connected with a first pole of the DC voltage intermediate circuit, and a second DC voltage connection connected with a second pole of the DC voltage intermediate circuit.

12. The modular multilevel converter according to claim 10, wherein the first bridge branch of the first submodule comprises a series connection from a first controllable power semiconductor switch and a first diode of the first submodule, wherein the cathode of the first diode is connected with the first direct voltage level of the first submodule, and the second bridge branch of the first submodule comprises a series connection from a second controllable power semiconductor switch and a second diode, wherein the anode of the second diode is connected with the second direct voltage level of the first submodule;

wherein the second submodule comprises a first bridge branch with a series connection from a first controllable power semiconductor switch and a first diode of the second submodule, wherein the cathode of the first diode is connected with the first direct voltage level of the second submodule, and a second bridge branch with a series connection from the second controllable power semiconductor switch and a second diode, wherein the anode of the second diode is connected with the second direct voltage level of the second submodule; and     wherein a first connection point between the first power semiconductor switch and the first diode of the first bridge branch of the first submodule forms a first module connection of the double submodule and a second connection point between the second power semiconductor switch and the second diode of the second bridge branch of the second submodule forms a second module connection of the double submodule.

13. The modular multilevel converter according to claim 12, further comprising a control device to control the operation of the modular multilevel converter, wherein the control device is configured to control the power semiconductor switches so that a bipolar output voltage is created and a unipolar current is always transmitted between the first module connection and the second module connection of each double submodule.

14. The modular multilevel converter according to claim 13, wherein the control device is configured to detect a short circuit in the DC voltage intermediate circuit and to subsequently switch on or off all power semiconductor switches of a double submodule in order to conduct a short circuit current within a modular multilevel converter through parallel current paths in the double submodule, wherein each current path comprises one of the capacitors of the submodules, wherein a counter voltage that counteracts the short circuit current is established.

15. The modular multilevel converter according to claim 13, wherein the control device is configured to control or regulate the voltage over the capacitors of the submodules so that when switching into a switching state with parallel capacitors, a difference of voltages of the capacitors does not exceed a predetermined first threshold value.

16. The modular multilevel converter according to claim 13, wherein the control device is configured to control or regulate the voltage over the capacitors of the submodules so that before switching into a switching state with parallel capacitors, a difference of voltages of the capacitors does not drop below a predetermined second threshold value.

17. The modular multilevel converter according to claim 13, wherein the control device is configured to control or regulate a voltage over a plurality of capacitors of the submodules such that when switching into a switching state with a parallel circuit of capacitors, a voltage across a first capacitor, having direct voltage node connected in the direction of flow to a second capacitor over diodes, is nearly the same or less than a voltage of the second capacitor.

18. The modular multilevel converter according to claim 13, wherein the control device is configured to control individual or multiple power semiconductor switches with a first control voltage, in order to switch them on for a transition into a switching state with a parallel connection of capacitors such that they can be operated in the active range with desaturating behavior in comparison to normal operation, and to subsequently control the individual or multiple power semiconductor switches with a higher second control voltage in order to operate them in the switching state with the parallel circuit of capacitors.

19. The modular multilevel converter according to claim 12, wherein when all of the power semiconductor switches are switched on, a current flows from the first module connection to the power semiconductor switch of the first submodule, through the capacitor of the first submodule, the common power semiconductor switch, the capacitor of the second submodule, and the power semiconductor switch of the second submodule, to the second module connection.

20. The modular multilevel converter according to claim 10, wherein the capacitor of each submodule is designed with capacitance values differing by 1-2%.

* * * * *